United States Patent [19]

Huxley, deceased et al.

[11] Patent Number: 5,001,838
[45] Date of Patent: Mar. 26, 1991

[54] SPIRIT LEVEL

[76] Inventors: Terrence Huxley, deceased, late of Aberbargoed; by Mary E. Huxley, heir, 66, Bedwellty Road, Aberbargoed, Mid Glamorgan CF8 9BA; Garry I. Lewis, 29, Gresham Place, Treharris, Mid-Glam., all of United Kingdom

[21] Appl. No.: 435,364

[22] PCT Filed: Apr. 7, 1988

[86] PCT No.: PCT/GB88/00269
§ 371 Date: Nov. 28, 1989
§ 102(e) Date: Nov. 28, 1989

[87] PCT Pub. No.: WO88/08115
PCT Pub. Date: Oct. 20, 1988

[30] Foreign Application Priority Data

Apr. 7, 1987 [GB] United Kingdom ............... 8708288

[51] Int. Cl.⁵ .............................................. G01C 9/28
[52] U.S. Cl. .............................. 33/388; 33/384
[58] Field of Search .................. 33/384, 385, 386, 387, 33/388

[56] References Cited

U.S. PATENT DOCUMENTS

| | | | |
|---|---|---|---|
| 84,880 | 12/1868 | Hill | 33/388 |
| 775,483 | 11/1904 | Whitehouse | 33/387 |
| 806,987 | 12/1905 | McDowell | 33/388 |
| 1,141,617 | 6/1915 | Creamer | 33/387 |
| 1,657,546 | 1/1928 | Patton | 33/388 |
| 1,830,009 | 11/1931 | Walters | 33/388 |
| 2,277,071 | 3/1942 | Cassell | 33/388 |
| 2,692,440 | 10/1954 | Walters | 33/387 |
| 3,159,926 | 12/1964 | Holderer | 33/387 |

FOREIGN PATENT DOCUMENTS

| | | | |
|---|---|---|---|
| 317275 | 8/1918 | Fed. Rep. of Germany | 33/387 |
| 642481 | 7/1962 | Italy | 33/384 |
| 0040706 | 4/1981 | Japan | 33/384 |
| 164177 | 6/1921 | United Kingdom | 33/387 |

*Primary Examiner*—Thomas B. Will
*Attorney, Agent, or Firm*—Body, Vickers & Daniels

[57] ABSTRACT

The spirit level, for use by carpenters, bricklayers or the like has a body comprising an elongate extrusion with at least one flat supporting edge 3. An outer rotatable member 10 is rotatably mounted in a transverse circular aperture in the elongate extrusion, and an inner rotatable member 11 is rotatably mounted in a transverse circular aperture in the outer rotatable member and coaxial therewith. A bubble tube 14 is secured to the inner rotatable member in fixed orientation relative thereto, such that rotation of the inner rotatable member effects coarse rotation of the bubble tube and rotation of the outer rotatable member (together with the inner rotatable member) effects fine rotation of the bubble tube. The angle can be measured by placing edge 3 on a test surface, successively rotating inner member 11 and outer member 10, and reading off the resulting angles on coarse scale 19 and fine scale 24.

12 Claims, 2 Drawing Sheets

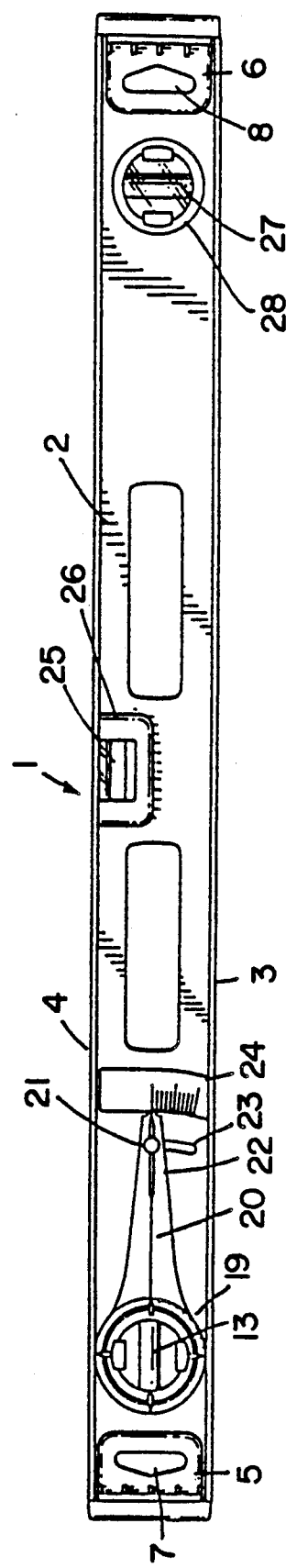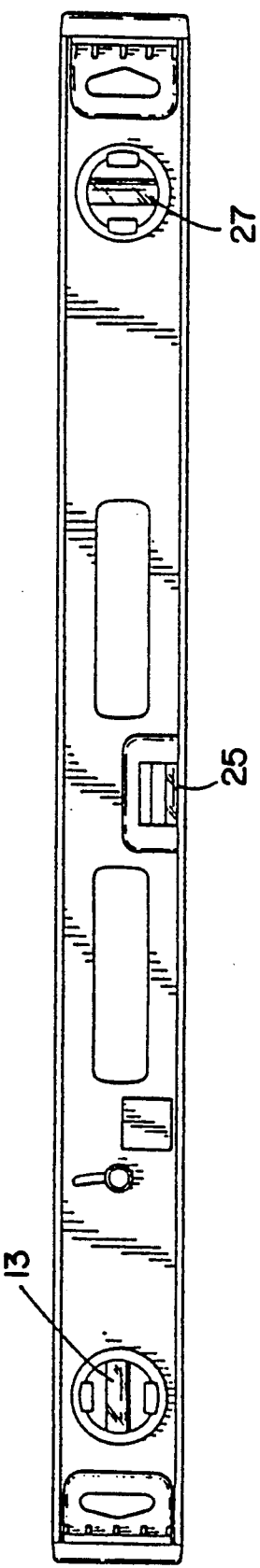

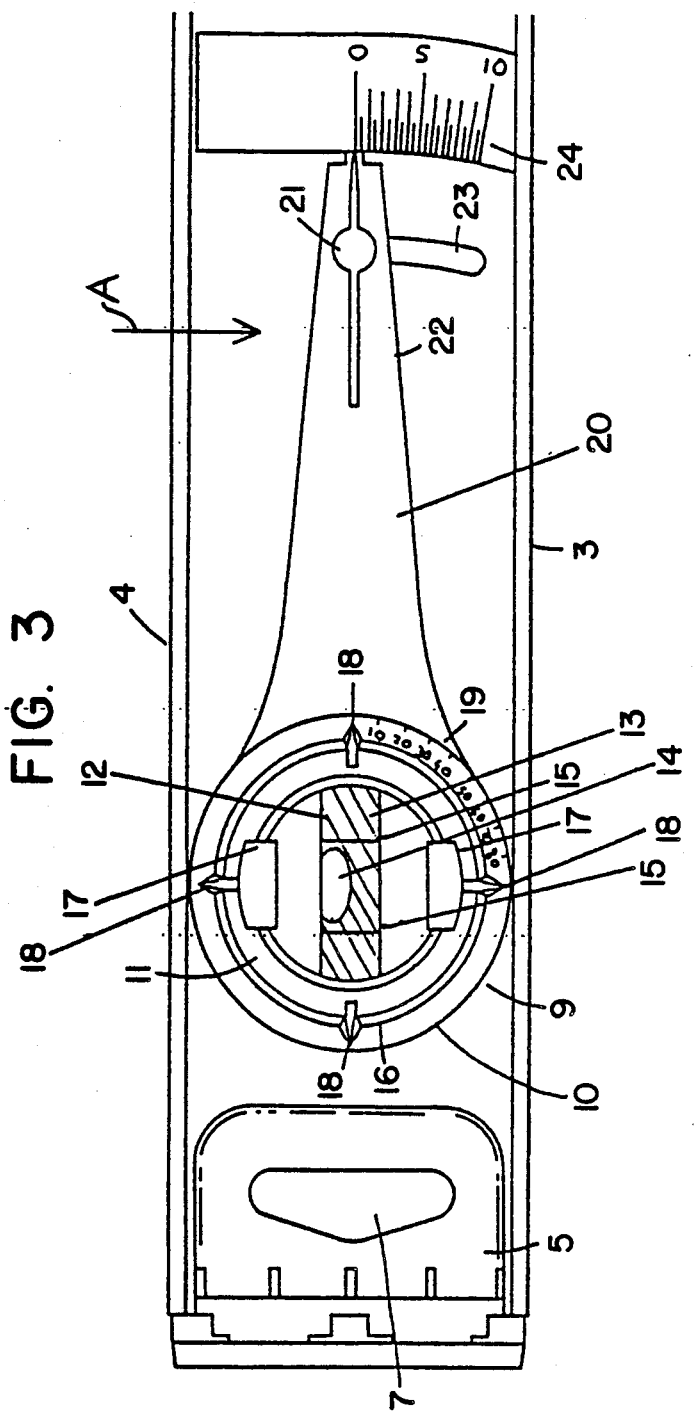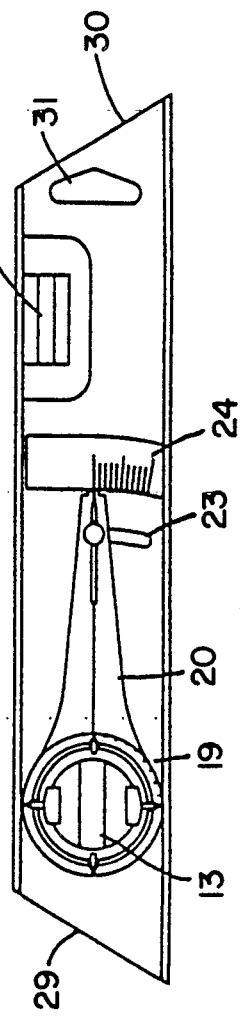

SPIRIT LEVEL

The present invention is concerned with spirit levels suitable for use by carpenters, bricklayers or the like, which levels can be used not only to provide an indication of whether a surface is vertical or horizontal, but also to provide a measure of the angle of such a surface relative to the vertical or horizontal.

Conventional spirit levels commonly used in the home and workshops by bricklayers, carpenters or the like incorporate at least one transparent tube containing a coloured liquid with a gas bubble incorporated therein. The bubble tube is housed in the spirit level such that when the level is placed on a flat horizontal or vertical surface (depending on the orientation of the bubble tube with respect to the level) the gas bubble comes to rest in the centre of the bubble tube between two lines or gradations marked on the tube. This type of spirit level is convenient for checking whether surfaces are level, for example, when finishing a workpiece with a plane or other such tool; however, such a spirit level is of little or no use in measuring the angles of surfaces relative to the horizontal or vertical.

Spirit levels are known, however, which can be used to measure angles of surfaces relative to the horizontal or vertical; such a known type of spirit level comprises a bubble tube housed in a rotatable member. The rotatable member has an angular scale at its periphery and is calibrated such that when the reading on the angular scale is 0°, the bubble tube is parallel to the longitudinal axis of the spirit level, and when the spirit level is placed on a level horizontal surface in this configuration, the gas bubble comes to rest substantially in the middle of the bubble tube between the two marking lines or gradations.

In use, the spirit level is placed on a surface and the rotatable member is rotated until the gas bubble comes to rest in the middle of the bubble tube between the marking lines or gradations. The bubble tube is then parallel to the horizontal, and the angle between the bubble tube and the longitudinal axis of the spirit level (that is, the angle of the surface with respect to the horizontal) is read from the scale. However, the accuracy of the angular scale is limited to approximately two degress, which may well not be accurate enough in certain applications.

It is an object of the present invention to provide a spirit level capable of measuring the angle of a surface relative to the horizontal or vertical in which the above disadvantages are at least alleviated. A spirit level according to the invention comprises:

(a) an elongate body having a flat supporting surface along at least one lateral edge thereof, said body having a transverse circular aperture therethrough;

(b) an outer rotatable member rotatably mounted in said aperture, said outer rotatable member having a transverse circular aperture therethrough coaxial with the aperture in said elongate body;

(c) an inner rotatable member rotatably mounted in the aperture in said outer rotatable member; and (d) a bubble tube secured to said inner member in fixed orientation with respect thereto; whereby rotation of said inner rotatable member effects coarse adjustment of the orientation of said bubble tube relative to said lateral edge, and rotation of said outer rotatable member with said bubble tube in fixed orientation with respect thereto effects fine adjustment of the orientation of said bubble tube relative to said lateral edge.

The inner rotatable member preferably carries a pointer which indicates the longitudinal axis of the bubble tube. Typically, the outer rotatable member has a coarse angular scale thereon, around the aperture in which the inner rotatable member is mounted, so as to indicate the relative angle between the longitudinal axis of the bubble tube and the supporting lateral edge of the spirit level.

The inner rotatable member is preferably rotatable through a series of predetermined positions, typically at 10° spacings and defined by complementary stop formations on inner and outer rotatable members. The inner rotatable member is typically rotatable through a full 360°.

The outer rotatable member is typically provided with an elongate pointer arranged to extend, in one position, parallel to the lateral supporting edge of the spirit level body. A fine angular scale is preferably provided on the spirit level body adjacent the distal end of the pointer. The outer rotatable member is preferably constrained from rotation by more than a predetermined amount, such as about 10°.

The body of the spirit level according to the invention preferably comprises a unitary extrusion, of, for example, aluminium or plastics material. The inner and outer rotatable members are typically plastics mouldings.

The spirit level according to the invention preferably incorporates at least one further bubble tube, the or each such bubble tube containing liquid and a gas bubble; the orientation of the or each such further bubble tube with respect to the spirit level is generally fixed. There is preferably provided one such further bubble tube with its longitudinal axis parallel to the longitudinal axis of the spirit level, and another bubble tube has its longitudinal axis perpendicular to the longitudinal axis of the spirit level.

The present invention will now be described further, with reference to the accompanying drawings in which:

FIG. 1 is a front elevation of an exemplary spirit level according to the invention;

FIG. 2 is a rear elevation of the spirit level of FIG. 1;

FIG. 3 is an expanded view of the left hand end portion showing more detail of the spirit level illustrated in FIGS. 1 and 2; and FIG. 4 is a front elevation of a further exemplary spirit level according to the invention.

Referring to FIGS. 1 to 3 of the drawings, a spirit level 1 comprises an elongate extrusion 2 of generally I-section, and having opposed flat lateral flanged edges 3, 4. At each end of the extrusion is secured a moulding 5, 6 each providing a respective hanging aperture 7, 8, which apertures are suitable for suspending the spirit level from a display rack or the like. Towards one end of the extrusion 2 (see FIG. 3) is a circular aperture 9 having mounted therein an outer rotatable member 10 and an inner rotatable member 11, with a bubble tube 12 secured therein. The inner rotatable member 11 is rotatable through 360 degrees in the outer rotatable member 10, preferably in a series of 10 degree steps, each step being defined by stop formations (not shown) on the inner member, on the outer member, or on both..

The bubble tube 12, which contains coloured liquid 13 and a gas bubble 14 (which, when the bubble tube is horizontal, is between gradations 15), is fixed in a circular aperture 16 through the inner rotatable member 11;

the latter can be rotated within outer rotatable member 10 by means of a pair of lugs 17 and has, in the embodiment illustrated, a series of four radially outwardly extending pointers 18 at 90 degree intervals.

The outer rotatable member 10 has a coarse angular scale 19 around its inner edge; in the illustrated embodiment of FIGS. 1 to 3, the coarse angular scale is for up to 90°, marked in 10° intervals. The inner rotatable member 11 is rotatable within the outer rotatable member 10 through a series of predetermined positions separated from one another by 10°.

The outer rotatable member 10 has an integral pointer 20, which is rotatable with the former. A screw 21 extends through the distal end 22 of the pointer and also through an arcuate slot 23 extending through the upright part of the "I" -shaped extrusion 2. The screw 21 can be tightened to lock the pointer 20, and therefore the outer rotatable member 10, in a particular position when it is desired to rotate the outer rotatable member about the axis of aperture 9. The length of the arcuate slot 23 serves to determine the maximum rotational movement of the outer rotatable member 10 (in the embodiment illustrated, this being a maximum of 10°).

A fixed, fine angular scale 24 is provided adjacent the end of pointer 20; in the illustrated embodiment, the fine angular scale reads up to 10° in half degree intervals.

In use of the spirit level to find the angle of a surface relative to the horizontal, the flat lateral edge 3 is first placed on the surface and the inner rotatable member 11 rotated until the bubble tube 12 is almost horizontal, but not past the horizontal (that is, when the gas bubble 14 is almost between gradations 15). The angle indicated on coarse angular scale 19 will then be a multiple of 10°. The outer rotatable member 10 is then rotated gradually by pushing in the direction of arrow A until the gas bubble 14 is centrally located between gradations 15. The bubble tube 12 would then be parallel to the horizontal and the angle between the bubble tube 12 and the flat lateral edge 3 (that is, the angle of the surface on which the edge 3 rests, with respect to the horizontal) is the sum of the angles on the coarse angular scale 19 and fine angular scale 24.

The angle can be measured remote from the surface if desired by tightening the screw 21 to secure the outer rotatable member 18 in fixed orientation. The spirit level according to the invention, by virtue of the coarse and fine angular scales as just described, can provide a measurement of the angle of the surface relative to the horizontal which is accurate to 0.5°.

The spirit level illustrated in FIGS. 1 and 2 additionally comprises a second bubble tube 25 secured in a supporting member 26 such that its axis is fixed parallel to edge 3, and a third bubble tube 27 secured in a supporting member 28 such that its axis is fixed perpendicular to edge 3.

The spirit level illustrated in FIG. 4 is broadly similar to that illustrated in FIG. 3 (and like parts are denoted by like reference numerals) except that the bubble tube perpendicular to edge 3 is omitted, and the ends 29, 30 of the extrusion 2 are bevelled and without any end mouldings corresponding to mouldings 5, 6 (although a hole 31 is provided at one end of the extrusion for hanging the device from a display rack or the like).

We claim:

1. A spirit level for use by carpenters, bricklayers or the like, which comprises:
    (a) an elongate body having a flat supporting surface along at least one lateral edge thereof, said body having a transverse circular aperture therethrough and a fine angular scale;
    (b) an outer rotatable member rotatably mounted in said aperture, said outer rotatable member having an elongate pointer portion interacting with said fine angular scale and a transverse circular aperture therethrough coaxial with the aperture in said elongate body;
    (c) an inner rotatable member rotatably mounted in the aperture in said outer rotatable member; and
    (d) a bubble tube secured to said inner member in fixed orientation with respect thereto; whereby rotation of said inner rotatable member effects coarse adjustment of the orientation of said bubble tube relative to said lateral edge, and rotation of said outer rotatable member with said bubble tube in fixed orientation with respect thereto effects fine adjustment of the orientation of said bubble tube relative to said lateral edge.

2. A spirit level according to claim 1, wherein said inner rotatable member carries a first pointer which indicates the longitudinal axis of said bubble tube.

3. A spirit level according to claim 2, wherein a coarse angular scale is provided around the aperture in said outer rotatable member to indicate the angle between the lateral edge of said body and the longitudinal axis of said bubble tube.

4. A spirit level according to claim 3 wherein said inner rotatable member is rotatably movable between a plurality of predetermined positions, each defined by stop means.

5. A spirit level according to claim 4 wherein said inner rotatable member is rotatable through 360.

6. A spirit level according to any of claims 1 or 5, wherein said elongate pointer is arranged to extend, in one position, parallel to said lateral edge.

7. A spirit level according to claim 3, wherein said inner rotatable member carries along with said first pointer three additional pointers all evenly spaced around the periphery of said member, said three additional pointers adapted to be able to interact with said coarse angular scale.

8. A spirit level according to claim 1, wherein said outer rotatable member is constrained from rotation by more than a predetermined amount, such as about 10 degrees.

9. A spirit level according to claim 1, wherein said elongate body comprises a unitary extrusion.

10. A spirit level according to claim 1, which includes at least one additional bubble tube.

11. A spirit level according to claim 10 wherein said at least one additional bubble tube includes first additional bubble tube having an axis fixed substantially parallel to said lateral edge and a second additional bubble tube having an axis fixed substantially perpendicular to said lateral edge.

12. A spirit level according to claim 1, wherein said outer rotatable member transverse circular aperture has a diameter and said elongate pointer portion has a length approximately greater than said diameter.

* * * * *